(12) United States Patent
Fujimoto et al.

(10) Patent No.: US 6,747,804 B2
(45) Date of Patent: Jun. 8, 2004

(54) OBJECTIVE LENS SYSTEM FOR MICROSCOPE

(75) Inventors: Yasushi Fujimoto, Tokyo (JP); Daisuke Nishiwaki, Tokyo (JP)

(73) Assignee: Olympus Corporation, Tokyo (JP)

( * ) Notice: Subject to any disclaimer, the term of this patent is extended or adjusted under 35 U.S.C. 154(b) by 121 days.

(21) Appl. No.: 10/176,639

(22) Filed: Jun. 24, 2002

(65) Prior Publication Data

US 2003/0053218 A1 Mar. 20, 2003

(30) Foreign Application Priority Data

Jul. 10, 2001 (JP) ........................................ 2001-208783

(51) Int. Cl.[7] .............................................. G02B 21/02
(52) U.S. Cl. ........................................ 359/656; 359/661
(58) Field of Search ................................ 359/656, 657, 359/658, 659, 660, 661

(56) References Cited

U.S. PATENT DOCUMENTS 5,699,196 A * 12/1997 Misawa ........................ 359/659
5,798,869 A * 8/1998 Watanabe .................... 359/658

2003/0053218 A1 * 3/2003 Fujimoto et al. ........... 359/656

* cited by examiner

Primary Examiner—David N Spector
(74) Attorney, Agent, or Firm—Kenyon & Kenyon

(57) ABSTRACT

An microscope objective lens system comprises a first lens unit including a plurality of cemented lens components and converging light coming from an object, a second lens unit including a negative lens component having a strong concave surface on the image side, and a third lens unit including a cemented doublet composed of a negative lens element having a concave surface on the object side and a positive lens element, wherein the objective lens system satisfies the following conditions:

$1.65 \leq nd \leq 1.8$ $25 \leq vd \leq 41$ $T360 \geq 0.5$ wherein nd and vd are refractive index at the Fraunhofer d-line and the Abbe's number of the positive lens element in the third lens unit, respectively, and T360 is an internal transmittance except for a reflection loss at 360 nm for 10 mm thickness of material forming the positive lens element in the third lens unit.

24 Claims, 5 Drawing Sheets

OBJECTIVE LENS SYSTEM FOR MICROSCOPE

CROSS-REFERENCE TO RELATED APPLICATION

This application claims benefits of Japanese Patent Application No. 2001-208,783, filed on Jul. 10, 2001, in Japan, the contents of which are hereby incorporated by reference.

BACKGROUND OF THE INVENTION

1. Field of the Invention

This invention relates to a microscope objective lens system, more particularly to a microscope objective lens system qualified as an apochromat class objective lens system having a large numerical aperture (N.A.), high transmittance in the ultra-violet wavelength region, and a low autofluorescence which is suitable for a fluorescent observation.

2. Description of the Related Art

Recently in the biological research field, the fluorescent microscopy has been widely used for observing specific substances in a living cell stained by fluorescent dyes because this way of observation is harmless to the cell.

Generally speaking, the fluorescent microscopy is a manner of observation in which a specimen is irradiated with a light having a short wavelength for excitation and observing the specimen by means of fluorescent light emitted therefrom. A conventional typical wavelength of light for excitation is 365 nm (Fraunhofer i-line) and recently, 340 nm has also become to be used for observing a calcium (Ca) ion in a living body. Other wavelengths included in the ultra-violet and visible regions are also used for excitation.

When the fluorescent microscope is constructed as a vertical illumination type, the objective lens systems exclusively used for the fluorescent microscopy are provided. These kinds of microscope objective lens systems are required to have (A) a large N.A. on its entrance side (high entrance N.A.),
(B) a large N.A. on its exit side (high exit N.A.),
(C) a favorably corrected longitudinal chromatic aberration,
(D) a favorably corrected image curvature to form a flat image of an object (high PLAN performance),
(E) a high transmittance in the wavelength regions of ultra-violet and visible light, and
(F) a low autofluorescence emittance.

(A) serves to increase the intensity of an illumination light. A bright illumination intensifies the fluorescent light emitted from the specimen. This improves the resolution and allows observing the fine structure of the specimen to a high degree of detail.

(B) serves to increase the brightness of an image formed by the objective lens system. The exit N.A. is calculated by dividing the entrance N.A. by the magnification power of the objective lens system.

(C) serves to allow use of the objective lens system for a wide wavelength range including ultra-violet and visible light because the excitation light and fluorescence have various wavelengths depending on the specimen to be observed.

(D) serves to allow observing a wide field of view at the same time. This improves the ease of operability of the microscope.

(E) serves to increase the intensity of the illumination light and brightness of the image. In the fluorescence microscope, illumination light does not have a broad wavelength band but a specific narrow wavelength band, which is included in the regions of ultra-violet or visible light. Therefore, it is important that the objective lens system has high transmittance in this wavelength region.

(F) serves to obtain a clear image having a high contrast. Autofluorescence of glass material used as a lens element in the objective lens system is a source of undesirable background light that degrades the image quality.

Among the above listed requirements (A) through (F), the features (E) and (F) are typical for an objective lens system used for a fluorescence observation. Therefore, the optical material (optical glass and/or optical crystal) used for this kind of microscope objective lens systems has optical properties to satisfy the requirements (E) and (F), that is, has a high transmittance and a small autofluorescence.

Microscope objective lens systems that meet the requirements (E) and (F) are described in the following publications.

1. Japanese Laid Open Patent application publication Sho 55-79,406
2. Japanese Patent Publication No. 3,140,111 (Japanese Laid Open Patent application publication Hei 5-142,477)
3. Japanese Laid Open Patent application publication Hei 7-230,039
4. Japanese Laid Open Patent application publication Hei 10-274,742
5. Japanese Laid Open Patent application publication Hei 11-174,339
6. Japanese Laid Open Patent application publication Hei 11-352,406

Publication No.1 discloses a fluorescent microscope objective lens system having a magnification power of 20× and an N.A. of 0.65. Publication No.2 discloses fluorescent microscope objective lens systems having a magnification power of 100× and an N.A of 1.3-1.35. Publication No.3 discloses fluorescent microscope objective lens systems respectively having a magnification power of 100× and an N.A. of 1.4, a magnification power of 40× and an N.A. of 1.35, and a magnification power of 20× and an N.A. of 0.8. Publication No.4 discloses a fluorescent microscope objective lens system having a magnification of 40× and an N.A. of 1.3. Publication No.5 discloses fluorescent microscope objective lens systems respectively having a magnification power of 40× and an N.A. of 1.3, and a magnification power of 100× and an N.A. of 1.3. Publication No.6 discloses a fluorescent microscope objective lens system having a magnification power of 100× and an N.A. of 1.3.

These microscope objective lens systems all meet the requirements (E) and (F). However, comparing these to the highest class microscope objective lens system, a so-called plan-apochromat objective in which the numerical aperture is extremely large and the aberrations, particularly the image curvature and longitudinal chromatic aberration including the secondary spectrum are highly corrected, the above described conventional objective lens systems are not satisfactory from the viewpoint of the basic requirements (A) through (D) for a microscope objective lens system.

The objective lens system disclosed in publication No.1 is small in numerical aperture and not satisfactorily corrected in flatness of the image. The objective lens system disclosed in publication No.2 is well corrected in flatness of the image and longitudinal chromatic aberration but the numerical aperture is small. The objective lens system disclosed in publication No.3 is large enough in numerical aperture and well corrected in the longitudinal chromatic aberration but the flatness of the image is not satisfactorily corrected. The objective lens system disclosed in publication No. 4 is not satisfactorily corrected in the secondary spectrum (the Fraunhofer g-line) and the flatness of the image. Among the objective lens systems disclosed in publication No. 5, the one having a magnification power of 100× is small in N.A. and unsatisfactorily corrected in the flatness of the image, whereas the other one having a magnification power of 40× is unsatisfactorily corrected in the flatness of the image. The objective lens system disclosed in publication No. 6 is small in N.A. and unsatisfactorily corrected in the secondary spectrum (the Fraunhofer g-line).

SUMMARY OF THE INVENTION

This invention provides a microscope objective lens system having a large numerical aperture, and well corrected flatness of the image and longitudinal chromatic aberration.

An objective lens system for microscope according to this invention comprises, in order from an object side, a first lens unit including a plurality of cemented lens components and converging light coming from an object, a second lens unit including a negative lens component having a concave surface of strong refractive power on the image side, and a third lens unit including a cemented doublet composed of a negative lens element having a concave surface on the object side and a positive lens element. Further, the microscope objective lens system satisfies the following conditions (1) through (3):

$$1.65 \leq nd \leq 1.8 \quad (1)$$

$$25 \leq vd \leq 41 \quad (2)$$

$$T360 \geq 0.5 \quad (3)$$

wherein nd and vd are refractive index at the Fraunhofer d-line and Abbe's number of the positive lens element in the third lens unit, respectively, and T360 is an internal transmittance except a reflection loss at 360 nm of the material of thickness 10 mm forming the positive lens element in the third lens unit.

The objective lens system according to this invention is particularly suitable for fluorescence microscopy.

Other features and advantages of this invention will become apparent from the following detailed description of the examples when taken in conjunction with the accompanied drawings and appended claims.

DETAILED DESCRIPTION OF THE EXAMPLES OF THE INVENTION

Figure 1:
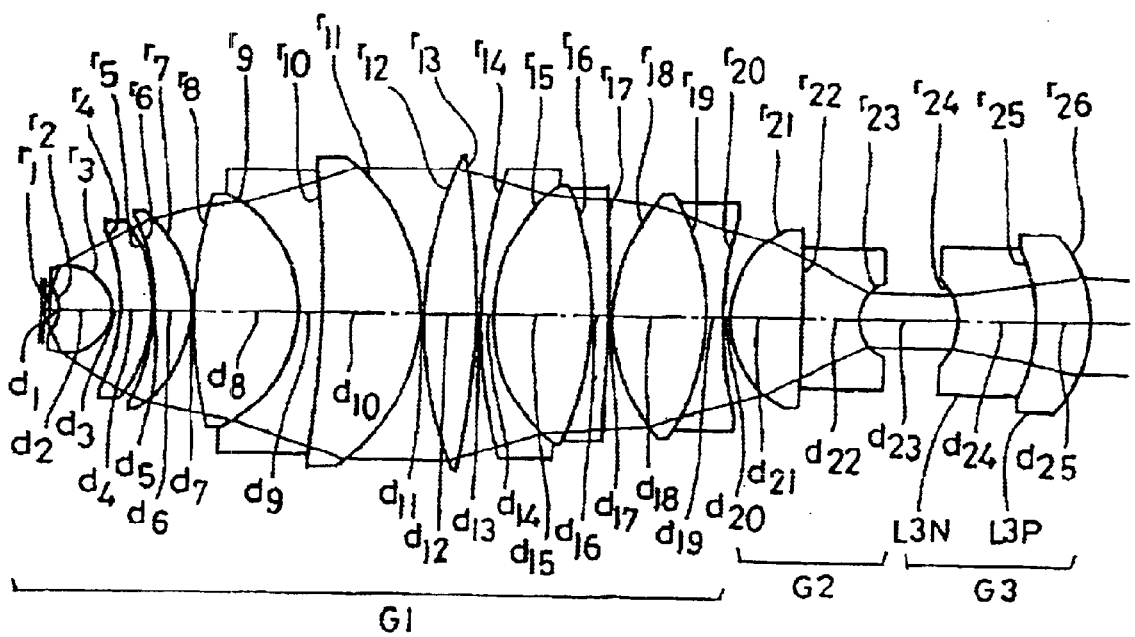
FIG. 1 is a sectional view of a microscope objective lens system of this invention described as a numerical example 1.

The microscope objective lens system according to this invention has a first lens unit including a plurality of cemented lens components and a function to converge a light coming from an object. This first lens unit serves to favorably correct various aberrations such as spherical aberration, longitudinal chromatic aberration, astigmatism, distortion and coma. At least two cemented lenses are necessary to correct chromatic aberration and if a cemented triplet is provided in the first lens unit, chromatic aberration is more favorably corrected.

The second lens unit has a strong negative optical power and includes a negative lens whose image side surface is formed as a concave surface having a stronger curvature than the object side surface thereof. This structure serves to correct favorably the Petzval sum which is not fully corrected in the first lens unit, spherical aberration, and coma. The negative lens in the second lens unit can be formed as a biconcave, a plano-concave, or a meniscus shape, each of which has a stronger curvature on the image side than on the object side. Further, the negative lens can be formed as a cemented meniscus lens component having a stronger curvature on the image side surface than on the object side surface.

The third lens unit includes a cemented lens component composed of a negative lens element having a concave surface on the object side and a positive lens element. The negative refractive power of the concave surface on the object side serves to correct the Petzval sum more favorably and other aberrations well.

In the objective lens system according to this invention, the positive lens element provided in the third lens unit is made of an optical material satisfying the conditions (1) through (3):

$$1.65 \leq nd \leq 1.8 \quad (1)$$

$$25 \leq vd \leq 41 \quad (2)$$

$$T360 \geq 0.5 \quad (3)$$

wherein 0.5 in the condition (3) means a transmittance of 50%.

As explained above, the microscope objective lens system used for fluorescent microscopy is required to have high transmittance in the wavelength region including ultra-violet and visible light, and low autofluorescence emittance. However, conventional glass material having Abbe's number less than 35, or Abbe's number less than 50 and a refractive index more than 1.62, is impossible to use for this kind of objective lens system because it is difficult to meet above mentioned requirements by using these glass materials. Therefore, in this kind of objective lens system, glass materials having high refractive index and small Abbe's number cannot be used to construct the lens system.

However, a glass material having a high refractive index and small Abbe's number is indispensable in order to correct the flatness of the image field and aberrations including the secondary spectrum over a large numerical aperture, and to obtain a so-called plan-apochromat class objective lens system.

This is because a large difference of refractive indices or Abbe's numbers between a positive lens element and a negative lens element of a cemented lens component is necessary to correct aberrations favorably.

On the other hand, the rearmost lens unit or a lens unit placed close to the rearmost lens unit, that is, the lens units disposed at the rear side of the objective lens system significantly serves to correct the chromatic aberration of magnification by disposing a lens element made of a glass material having a large color dispersion (small Abbe's number). In the microscope objective lens system, the amounts of spherical aberration and longitudinal chromatic aberration become large as the numerical aperture becomes large. When a priority is given to correcting these aberrations in the front side lens units of the objective lens system, it becomes difficult to correct chromatic aberration of magnification simultaneously in the front side lens units. Therefore, the burden of correcting chromatic aberration of magnification is inevitably required of the rear side lens units.

Moreover, in a case where a positive lens element disposed at the rear side of the objective lens system has a low refractive index, radii of curvatures of the surfaces of the positive lens element become small and the amounts of spherical aberration, longitudinal chromatic aberration, coma and astigmatism become large. This causes difficulty to balance the aberrations of the objective lens system.

Recently, new glass materials have been developed which satisfy the conditions (1), (2) and (3). These glass materials contain $Nb_2O_5$ or $Ta_2O_5$ as constituents and have features of high transmittance in the ultra-violet and visible wavelength regions, have low autofluorescence emittance, and meet the requirements (E) and (F) which are particularly important for an objective lens system used for fluorescence microscopy.

Actual examples of these kind of new glass materials are S-NBH5 (nd=1.65412, vd=39.7, T360=0.83, T340=0.47), S-NBH8 (nd=1.72047, vd=34.7, T360=0.67, T340=0.24), and S-NBH51 (nd=1.74950, vd=35.3, T360=0.68, T340=0.24) manufactured by OHARA Inc. of Kanagawa, Japan.

As mentioned before, the microscope objective lens system according to this invention includes a positive lens element of a cemented doublet in the third lens unit which is made of a glass material satisfying the conditions (1) through (3), and this makes an objective lens system particularly suitable for a fluorescence microscopy a reality.

When the lower limit 1.65 of the condition (1) is exceeded, curvature of the surfaces of the positive lens element in the third lens unit become large and it becomes difficult to balance aberrations of the objective lens system. On the other hand, when the upper limit 1.8 of the condition (1) is exceeded, the requirement (E) is violated because these kinds of glass materials tend to have low transmittance, especially in the ultra-violet wavelength region, when the refractive indices thereof are high.

When the lower limit 25 of the condition (2) is exceeded, a large amount of longitudinal chromatic aberration is produced by the positive lens element in the third lens unit and it causes difficulty in balancing aberrations of the objective lens system. When the upper limit 41 is exceeded, chromatic aberration of magnification of the positive lens element in the third lens unit becomes undercorrected.

When the lower limit 0.5 of the condition (3) is exceeded, the glass material does not meet the requirement (E) and therefore, is not suitable for an objective lens system for fluorescence microscopy.

When the conditions (1) and (2) are replaced by the following conditions (1-1) and (2-1), more favorable result will be obtained:

$$1.7 \leq nd \leq 1.75 \quad (1\text{-}1)$$

$$30 \leq vd \leq 36 \quad (2\text{-}1)$$

By using glass materials satisfying these conditions, autofluorescence, transmittance of the ultra-violet light and aberrations of the objective lens system are balanced more favorably. Particularly, by increasing the lower limit from 1.65 to 1.7, it becomes easier to correct aberrations of the objective lens system. In addition, by decreasing the upper limit from 1.8 to 1.75, autofluorescence and transmittance of the ultra-violet light are improved.

By decreasing the upper limit from 41 to 36 as shown in condition (2-1), it becomes easier to correct aberrations of the objective lens system.

Further, when conditions (4) and (5) shown below are satisfied, more favorable result will be obtained:

$$vd(L3N) - vd(L3P) > 10 \quad (4)$$

$$|nd(L3N) - nd(L3P)| < 0.2 \quad (5)$$

wherein vd(L3N), vd(L3P) are Abbe's numbers of the negative lens element and the positive lens element in the third lens unit, respectively, and nd(L3N), nd(L3P) are refractive indices at the Fraunhofer d-line of the negative lens element and the positive lens element in the third lens unit, respectively.

It is necessary to use glass material having a small Abbe's number (large color dispersion) for the positive lens element and a large Abbe's number (small color dispersion) for the negative lens element in the third lens unit for the purpose of correcting the chromatic aberration of magnification of the objective lens system.

In a case where the negative lens element and a positive lens element of the cemented lens component in the third lens unit satisfy the condition (4), chromatic aberration of magnification is well corrected. On the other hand, when the lower limit 10 is exceeded, it becomes difficult to correct the chromatic aberration of magnification favorably.

The condition (5) serves for attaining good balance of the various aberrations. When the upper limit 0.2 is exceeded, the difference between the refractive indices of the negative lens element and the positive lens element in the third lens unit become large. This makes the amount of aberrations produced by the cementing surface of the cemented lens component large and also makes it difficult to correct aberration of the entire lens system in good balance.

The objective lens system preferably satisfies the following condition (6):

$$|f2/f| \leq 20 \quad (6)$$

wherein f2 is a focal length of the second lens unit, and f is a focal length of the objective lens system as a whole.

When the upper limit 20 is exceeded, the refractive power of the second lens unit become too weak to correct the Petzval sum and the curvature of field will deteriorate. In a case where the aberrations are not fully corrected by the second lens unit and are attempted to be compensated by the third lens unit, the amount of aberration produced by the third lens unit become large.

The objective lens system preferably satisfies the following condition (7):

$$|R(L3P)/f| \geq 2.6 \quad (7)$$

wherein R(L3P) is a radius of curvature of the image side surface of the positive lens element in the third lens unit.

When the lower limit 2.6 of the condition (7) is exceeded, the curvature of the image side surface of the positive lens element in the third lens unit become too strong and aberrations caused by the surface, especially coma, become too large to balance aberrations as a whole.

The objective lens system according to this invention preferably includes at least two cemented triplets in the first lens unit to favorably correct spherical aberration and longitudinal chromatic aberration including secondary spectrum.

SPECIFIC NUMERICAL EXAMPLES

FIG. 1 through FIG. 4 are sectional views of numeric examples of this invention. Numerical data of each examples are given below.

Numerical Example 1
Magnification Power 100×, N.A. 1.45, Field Number 26.5, W.D. 0.15, Total Length 59.36

| r1 = ∞ | d1 = 0.5136 | n1 = 1.51633 | v1 = 64.15 |
| r2 = −1.9022 | d2 = 2.7702 | n2 = 1.75500 | v2 = 52.32 |
| r3 = −2.3778 | d3 = 0.2767 | | |
| r4 = −11.0234 | d4 = 1.6727 | n3 = 1.49700 | v3 = 81.54 |
| r5 = −8.3960 | d5 = 0.1321 | | |
| r6 = −11.5121 | d6 = 2.0521 | n4 = 1.49700 | v4 = 81.54 |
| r7 = −6.7079 | d7 = 0.1205 | | |
| r8 = 24.2059 | d8 = 5.8975 | n5 = 1.43875 | v5 = 94.99 |
| r9 = −6.8330 | d9 = 1.2964 | n6 = 1.74100 | v6 = 52.64 |
| r10 = −61.2342 | d10 = 5.6428 | n7 = 1.43875 | v7 = 94.99 |
| r11 = −10.0117 | d11 = 0.2000 | | |
| r12 = 20.1093 | d12 = 3.0743 | n8 = 1.43875 | v8 = 94.99 |
| r13 = −41.8986 | d13 = 0.2000 | | |
| r14 = 25.0008 | d14 = 0.7954 | n9 = 1.75500 | v9 = 52.32 |
| r15 = 8.6458 | d15 = 5.8479 | n10 = 1.43875 | v10 = 94.99 |
| r16 = −15.8080 | d16 = 0.8000 | n11 = 1.75500 | v11 = 52.32 |
| r17 = −103.4152 | d17 = 0.2000 | | |
| r18 = 9.3938 | d18 = 5.4070 | n12 = 1.43875 | v12 = 94.99 |
| r19 = −11.5986 | d19 = 0.9404 | n13 = 1.49831 | v13 = 65.03 |
| r20 = 19.4800 | d20 = 0.3650 | | |
| r21 = 5.2275 | d21 = 4.2874 | n14 = 1.43875 | v14 = 94.99 |
| r22 = −134.2263 | d22 = 3.3711 | n15 = 1.75500 | v15 = 52.32 |
| r23 = 2.1276 | d23 = 5.6898 | | |
| r24 = −3.1653 | d24 = 4.3010 | n16 = 1.61700 | v16 = 62.80 |
| r25 = −9.1177 | d25 = 3.1866 | n17 = 1.72047 | v17 = 34.71 |
| r26 = −6.8626 | | | |
| nd(L3P) = 1.72047 | | vd(L3N) = 62.8 | |
| vd(L3P) = 34.7 | | vd(L3N) − vd(L3P) = 28.09 | |
| T360(L3P) = 0.67 | | \| nd(L3N) − nd(L3P) \| = 0.103 | |
| nd(L3N) = 1.617 | | | |
| f = 1.8 | | \| f1/f \| = 3.72 | |
| f1 = 6.701 | | \| f2/f \| = 4.34 | |
| f2 = −7.817 | | \| f3/f \| = 48.37 | |
| f3 = −87.065 | | | |
| \| R(L3P)/f \| = 3.81 | | | |

Numerical Example 2
Magnification Power 100×, N.A. 1.4, Field Number 26.5, W.D. 0.15, Total Length 49.56

| r1 = ∞ | d1 = 0.5000 | n1 = 1.51633 | v1 = 64.15 |
| r2 = −1.5660 | d2 = 2.8050 | n2 = 1.75500 | v2 = 52.32 |
| r3 = −2.4571 | d3 = 0.1000 | | |
| r4 = −41.4271 | d4 = 3.6613 | n3 = 1.43875 | v3 = 94.99 |
| r5 = −5.7417 | d5 = 0.1000 | | |
| r6 = 11.9388 | d6 = 4.9598 | n4 = 1.43875 | v4 = 94.99 |
| r7 = −8.2962 | d7 = 1.0240 | n5 = 1.74100 | v5 = 52.64 |
| r8 = 20.1050 | d8 = 5.0349 | n6 = 1.43875 | v6 = 94.99 |
| r9 = −10.0738 | d9 = 0.1000 | | |
| r10 = 37.3858 | d10 = 2.6776 | n7 = 1.43875 | v7 = 94.99 |
| r11 = −27.4359 | d11 = 0.0996 | | |
| r12 = 20.1201 | d12 = 1.3120 | n8 = 1.75500 | v8 = 52.32 |
| r13 = 6.7987 | d13 = 4.0920 | n9 = 1.43875 | v9 = 94.99 |
| r14 = −24.5755 | d14 = 1.2120 | n10 = 1.75500 | v10 = 52.32 |
| r15 = −140.3679 | d15 = 0.1000 | | |
| r16 = 8.5944 | d16 = 5.2361 | n11 = 1.43875 | v11 = 94.99 |
| r17 = −6.3117 | d17 = 0.7607 | n12 = 1.51633 | v12 = 64.15 |
| r18 = 23.5004 | d18 = 0.0998 | | |
| r19 = 4.1449 | d19 = 3.8192 | n13 = 1.43875 | v13 = 94.99 |
| r20 = −29.6373 | d20 = 2.8474 | n14 = 1.74100 | v14 = 52.64 |
| r21 = 1.9303 | d21 = 2.4894 | | |
| r22 = −2.5781 | d22 = 3.4905 | n15 = 1.67790 | v15 = 55.34 |
| r23 = −7.6346 | d23 = 2.7188 | n16 = 1.73777 | v16 = 32.23 |
| r24 = −5.6059 | | | |
| nd(L3P) = 1.73777 | | vd(L3N) = 55.34 | |
| vd(L3P) = 32.23 | | vd(L3N) − vd(L3P) = 23.11 | |
| T360(L3P) = 0.73 | | \| nd(L3N) − nd(L3P) \| = 0.06 | |
| nd(L3N) = 1.6779 | | | |
| f = 1.8 | | \| f1/f \| = 2.88 | |
| f1 = 5.186 | | \| f2/f \| = 4.8 | |
| f2 = −8.648 | | \| f3/f \| = 37.43 | |
| f3 = −67.369 | | | |
| \| R(L3P)/f \| = 3.11 | | | |

Numerical Example 3

Magnification Power 100×, N.A. 1.4, Field Number 26.5, W.D. 0.15, Total Length 49.36

| r1 = ∞ | d1 = 0.5000 | n1 = 1.51633 | v1 = 64.15 |
| r2 = −1.5660 | d2 = 2.8000 | n2 = 1.75500 | v2 = 52.32 |
| r3 = −2.4628 | d3 = 0.1081 | | |
| r4 = −70.9829 | d4 = 3.7327 | n3 = 1.43875 | v3 = 94.99 |
| r5 = −5.9260 | d5 = 0.1000 | | |
| r6 = 12.2913 | d6 = 4.8110 | n4 = 1.43875 | v4 = 94.99 |
| r7 = −8.4952 | d7 = 1.0000 | n5 = 1.74100 | v5 = 52.64 |
| r8 = 19.1643 | d8 = 4.7990 | n6 = 1.43875 | v6 = 94.99 |
| r9 = −10.8485 | d9 = 0.1000 | | |
| r10 = 50.2046 | d10 = 2.7796 | n7 = 1.43875 | v7 = 94.99 |
| r11 = −18.3157 | d11 = 0.1994 | | |
| r12 = 20.7027 | d12 = 1.2952 | n8 = 1.74100 | v8 = 52.64 |
| r13 = 6.7728 | d13 = 4.1862 | n9 = 1.43875 | v9 = 94.99 |
| r14 = −25.6719 | d14 = 1.1839 | n10 = 1.74100 | v10 = 52.64 |
| r15 = −254.5610 | d15 = 0.0951 | | |
| r16 = 8.7339 | d16 = 4.9518 | n11 = 1.43875 | v11 = 94.99 |
| r17 = −6.7842 | d17 = 0.8000 | n12 = 1.51633 | v12 = 64.15 |
| r18 = 21.1248 | d18 = 0.1000 | | |
| r19 = 4.5000 | d19 = 4.0100 | n13 = 1.49700 | v13 = 81.54 |
| r20 = −25.7035 | d20 = 0.9191 | n14 = 1.61340 | v14 = 43.84 |
| r21 = 13.1075 | d21 = 0.8087 | | |
| r22 = −79.3151 | d22 = 0.8271 | n15 = 1.61340 | v15 = 43.84 |
| r23 = 2.0026 | d23 = 1.8441 | | |
| r24 = −2.3836 | d24 = 3.9078 | n16 = 1.67790 | v16 = 55.34 |
| r25 = −41.8846 | d25 = 3.1811 | n17 = 1.74951 | v17 = 35.33 |
| r26 = −6.3179 | | | |
| nd(L3P) = 1.74951 | | vd(L3N) = 55.34 | |
| vd(L3P) = 35.33 | | vd(L3N) − vd(L3P) = 20.01 | |
| T360(L3P) = 0.68 | | \| nd(L3N) − nd(L3P) \| = 0.072 | |
| nd(L3N) = 1.6779 | | | |
| f = 1.8 | | \| f1/f \| = 24.59 | |
| f1 = −44.259 | | \| f2/f \| = 1.76 | |
| f2 = −3.172 | | \| f3/f \| = 19.79 | |
| f3 = −35.624 | | | |
| \| R(L3P)/f \| = 3.51 | | | |

Numerical Example 4
Magnification Power 60×, N.A. 1.4, Field Number 26.5, W.D. 0.15, Total Length 48.56

| | | | |
|---|---|---|---|
| r1 = ∞ | d1 = 0.3800 | n1 = 1.51633 | v1 = 64.15 |
| r2 = −2.1198 | d2 = 3.9701 | n2 = 1.78650 | v2 = 50.00 |
| r3 = −3.1211 | d3 = 0.1000 | | |
| r4 = −16.0630 | d4 = 1.8946 | n3 = 1.56907 | v3 = 71.30 |
| r5 = −8.1234 | d5 = 0.1000 | | |
| r6 = ∞ | d6 = 2.2991 | n4 = 1.56907 | v4 = 71.30 |
| r7 = −14.4537 | d7 = 0.1000 | | |
| r8 = 67.7559 | d8 = 4.0257 | n5 = 1.49700 | v5 = 81.61 |
| r9 = −8.3163 | d9 = 1.0000 | n6 = 1.61340 | v6 = 43.84 |
| r10 = 13.8764 | d10 = 5.8117 | n7 = 1.43875 | v7 = 94.99 |
| r11 = −10.3364 | d11 = 0.3000 | | |
| r12 = 18.1741 | d12 = 1.0000 | n8 = 1.61340 | v8 = 43.84 |
| r13 = 6.6001 | d13 = 6.1540 | n9 = 1.43875 | v9 = 94.99 |
| r14 = −30.7753 | d14 = 1.1000 | n10 = 1.61340 | v10 = 43.84 |
| r15 = 30.6665 | d15 = 0.1000 | | |
| r16 = 11.0179 | d16 = 2.3908 | n11 = 1.43875 | v11 = 94.99 |
| r17 = 18.3385 | d17 = 0.1000 | | |
| r18 = 7.0899 | d18 = 6.5042 | n12 = 1.61800 | v12 = 63.39 |
| r19 = −8.0917 | d19 = 1.0000 | n13 = 1.61340 | v13 = 43.84 |
| r20 = 3.3132 | d20 = 3.4247 | | |
| r21 = −3.9702 | d21 = 2.6421 | n14 = 1.61340 | v14 = 43.84 |
| r22 = 18.4063 | d22 = 3.8429 | n15 = 1.73777 | v15 = 32.23 |
| r23 = −8.1539 | | | |
| nd (L3N) = 1.73777 | | vd(L3N) = 43.84 | |
| vd(L3P) = 32.23 | | vd(L3N) − vd(L3P) = 11.61 | |
| T360(L3P) = 0.73 | | \| nd(L3N) − nd(L3P) \| = 0.124 | |
| nd(L3N) = 1.6134 | | | |
| f = 3 | | \| f1/f \| = 1.43 | |
| f1 = 4.29 | | \| f2/f \| = 14.69 | |
| f2 = −44.08 | | \| f3/f \| = 96.87 | |
| f3 = −290.62 | | | |
| \| R(L3P)/f \| = 2.72 | | | | wherein r1, r2, . . . are radii of curvatures of respective lens surfaces, d1, d2, . . . are distances between lens surfaces, n1, n2, . . . are refractive indices at the Fraunhofer d-line (587.56 nm) of respective lens elements, v1 , v2, . . . are Abbe's numbers of respective lens elements, and total length means the distance from the specimen to the rear end of the objective lens system measured along the optical axis. The unit of length is the millimeter.

FIG. 1 shows a lens layout of the numerical example 1. The first lens unit G1 comprises a hemispherical plano-convex cemented doublet (r1–r3) composed of a plano-convex lens element and a meniscus lens element, two positive meniscus lens elements (r4–r7) each having a concave surface on the object side, a cemented triplet (r8–r11) composed of a positive lens element, a negative lens element and a positive lens element, a positive lens element (r12–r13), a cemented triplet (r14–r17) composed of a negative lens element, a positive lens element and a negative lens element, and a cemented meniscus lens component (r18–r20) composed of a positive lens element and a negative lens element. The second lens unit G2 comprises a cemented lens component (r21–r23) having a strong negative refractive power composed of a positive lens element and a negative lens element, and having a strong concave surface on the image side. The third lens unit G3 comprises a cemented meniscus lens component (r24–r26) having a weak negative refractive power composed of a negative lens element L3N and a positive lens element L3P, and having a concave surface on the object side.

The numerical example 1 is an immersion objective lens system having a magnification power of 100× and an N.A. of 1.45.

The positive lens element L3P is made of a glass material which satisfies the conditions (1), (1-1), (2), (2-1) and (3). Moreover, the objective lens system satisfies the conditions (4), (5), (6) and (7).

Figure 2:
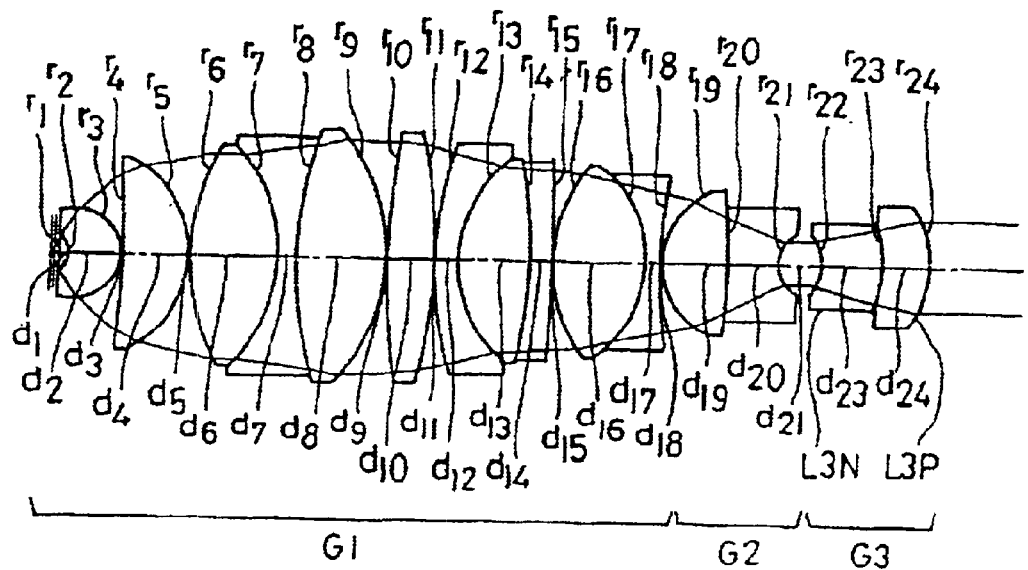
FIG. 2 is a sectional view of a microscope objective lens system of this invention described as a numerical example 2.

FIG. 2 shows a lens layout of the numerical example 2. The first lens unit G1 comprises a hemispherical plano-convex cemented doublet (r1–r3) composed of a plano-convex lens element and a meniscus lens element, a positive meniscus lens element (r4–r5) having a concave surface on the object side, a cemented triplet (r6–r9) composed of a positive lens element, a negative lens element and a positive lens element, a positive lens element (r10–r11), a cemented triplet (r12–r15) composed of a negative lens element, a positive lens element and a negative lens element, and a cemented meniscus lens component (r16–r18) composed of a positive lens element and a negative lens element. The second lens unit G2 comprises a cemented meniscus lens component (r19–r21) having a strong negative refractive power composed of a positive lens element and a negative lens element, and having a strong concave surface on the image side. The third lens unit G3 comprises a cemented meniscus lens component (r22-r24) having a weak negative refractive power composed of a negative lens element L3N and a positive lens element L3P, and having a concave surface on the object side.

The numerical example 2 is an immersion objective lens system having a magnification power of 100× and an N.A. of 1.4.

The positive lens element L3P is made of a glass material which satisfies the conditions (1), (1-1), (2), (2-1) and (3). Moreover, the objective lens system satisfies the conditions (4), (5), (6) and (7).

Figure 3:
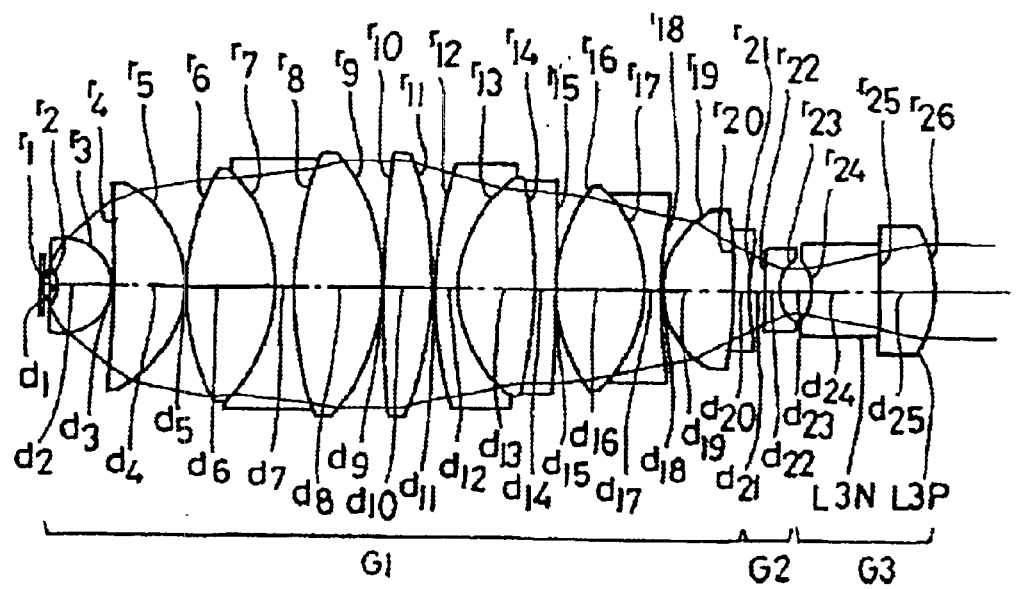
FIG. 3 is a sectional view of a microscope objective lens system of this invention described as a numerical example 3.

FIG. 3 shows a lens layout of the numerical example 3. The first lens unit G1 comprises a hemispherical plano-convex cemented doublet (r1–r3) composed of a plano-convex lens element and a meniscus lens element, a positive meniscus lens element (r4–r5) having a concave surface on the object side, a cemented triplet (r6–r9) composed of a positive lens element, a negative lens element and a positive lens element, a positive lens element (r10–r11), a cemented triplet (r12–r15) composed of a negative lens element, a positive lens element and a negative lens element, a cemented meniscus lens component (r16–r18) composed of a positive lens element and a negative lens element, and a cemented meniscus lens component (r19–r21) composed of a positive lens element and a negative lens element. The second lens unit G2 comprises a meniscus lens component (r22–r23) having a strong negative refractive power and a strong concave surface on the image side. The third lens unit G3 comprises a cemented meniscus lens component (r24–r26) having a weak refractive power composed of a negative lens element L3N and a positive lens element L3P.

The numerical example 3 is an immersion objective lens system having a magnification power of 100× and an N.A. of 1.4.

The positive lens element L3P is made of a glass material which satisfies the conditions (1), (1-1), (2), (2-1) and (3). Moreover, the objective lens system satisfies the conditions (4), (5), (6) and (7).

Figure 4:
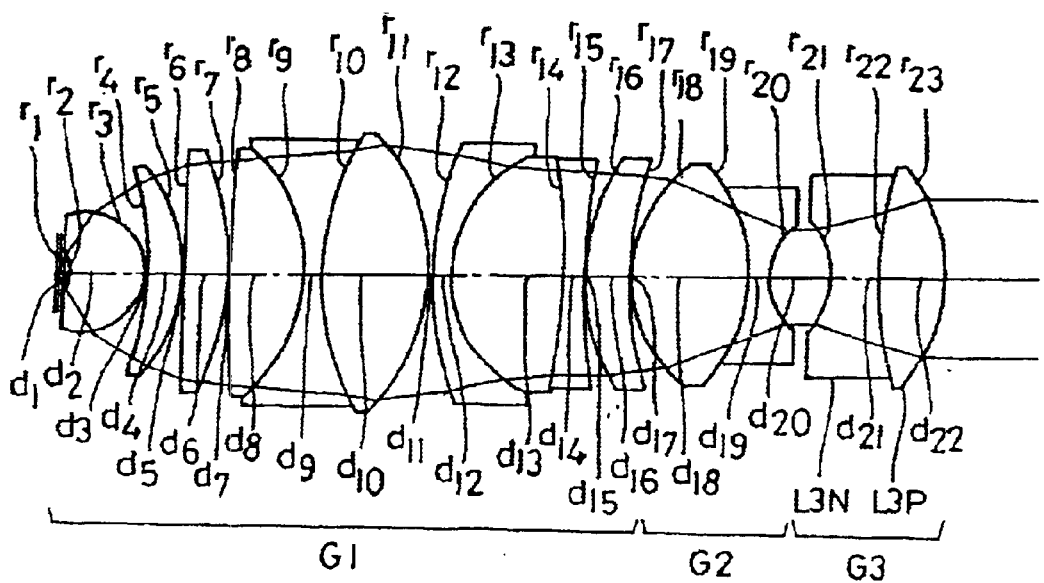
FIG. 4 is a sectional view of a microscope objective lens system of this invention described as a numerical example 4.
Figure 5A:
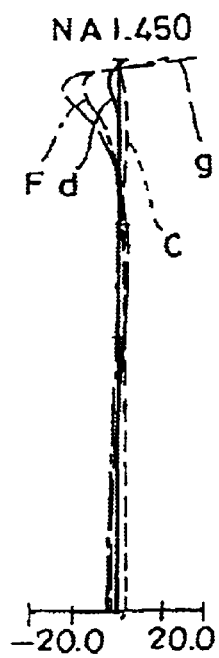
FIGS. 5A through 5D are graphs of aberrations of the numerical example 1.
Figure 5B:
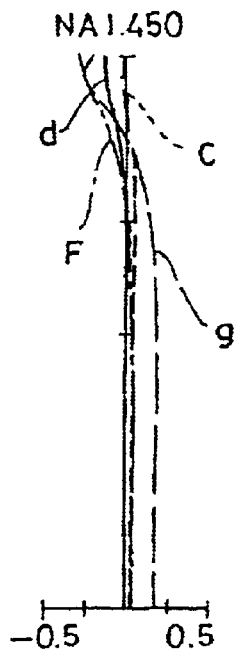
Figure 5C:
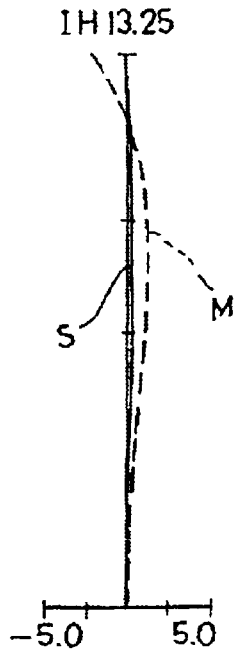
Figure 5D:
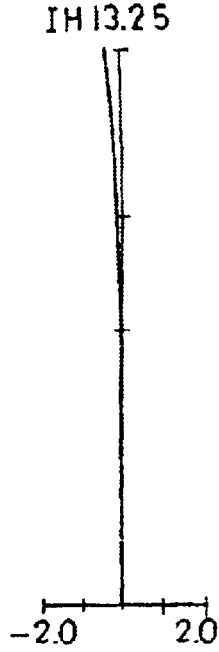
Figure 6A:
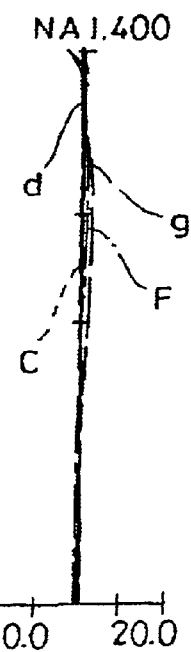
FIGS. 6A through 6D are graphs of aberrations of the numerical example 2.
Figure 6B:
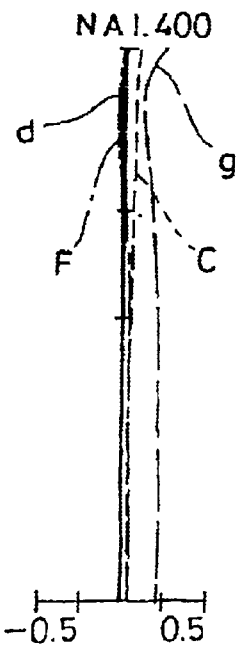
Figure 6C:
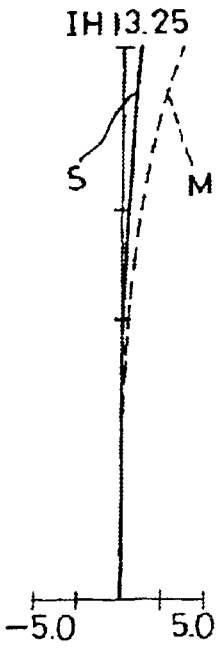
Figure 6D:
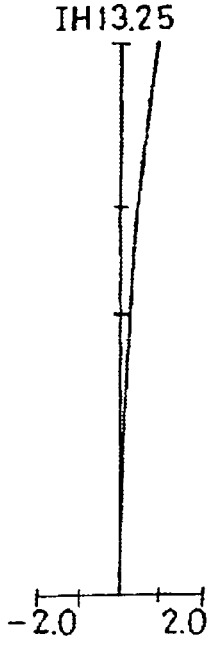
Figure 7A:
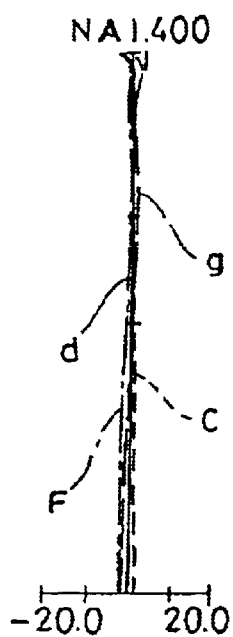
FIGS. 7A through 7D are graphs of aberrations of the numerical example 3.
Figure 7B:
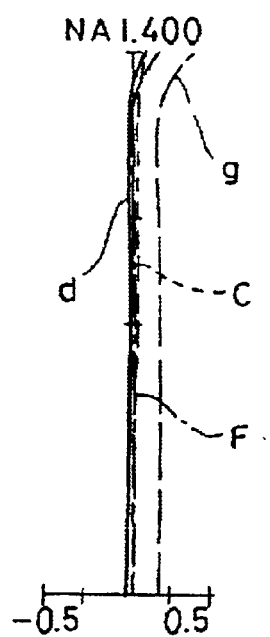
Figure 7C:
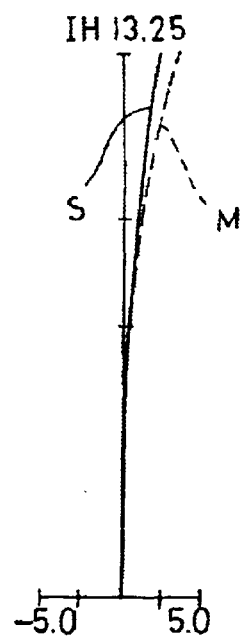
Figure 7D:
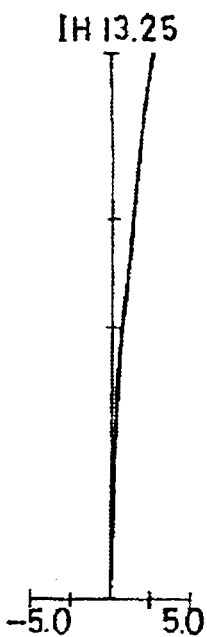
Figure 8A:
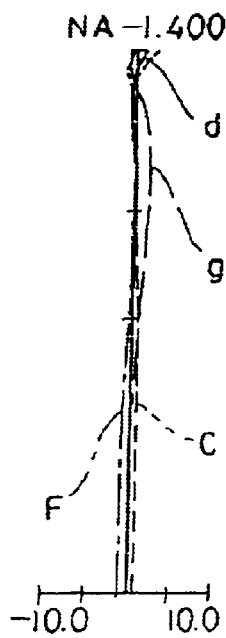
FIGS. 8A through 8D are graphs of aberrations of the numerical example 4.
Figure 8B:
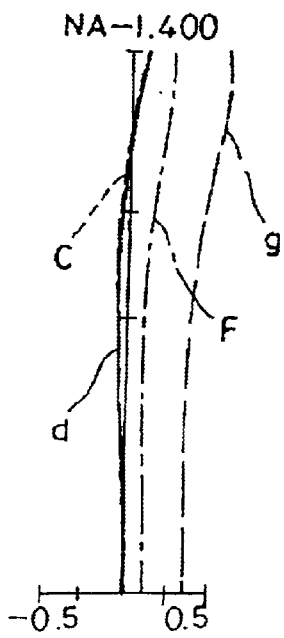
Figure 8C:
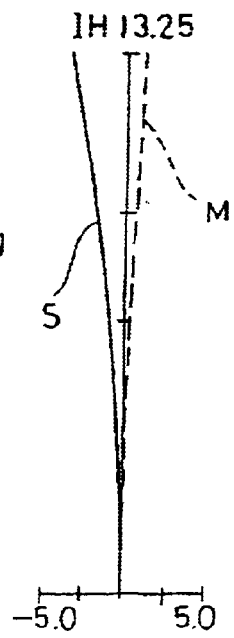
Figure 8D:
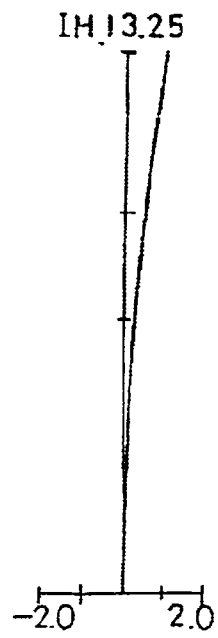

FIG. 4 shows a lens layout of the numerical example 4. The first lens unit G1 comprises a hemispherical plano-convex cemented doublet (r1–r3) composed of a plano-convex lens element and a meniscus lens element, a positive meniscus lens element (r4–r5) having a concave surface on the object side, a plano-convex lens element (r6–r7) having a plane surface in the object side, a cemented triplet (r8–r11) composed of a positive lens element, a negative lens element and a positive lens element, a cemented triplet (r12–r15) composed of a negative lens element, a positive lens element and a negative lens element, a positive meniscus lens element (r16–r17). The second lens unit G2 comprises a cemented meniscus lens component (r18–r20) having a strong negative refractive power composed of a positive lens element and a negative lens element, and having a strong concave surface on the image side. The third lens unit G3 comprises a cemented meniscus lens component (r21–r23) composed of a negative lens element L3N and a positive lens element L3P, and a concave surface on the object side. The third lens unit G3 has a very weak refractive power less than 0.004 in absolute value.

The numerical example 4 is an immersion objective lens system having a magnification power of 60× and an N.A. of 1.4.

The positive lens element L3P is made of a glass material which satisfies the conditions (1), (1-1), (2), (2-1) and (3). Moreover, the objective lens system satisfies the conditions (4), (5), (6) and (7).

Figure 9:
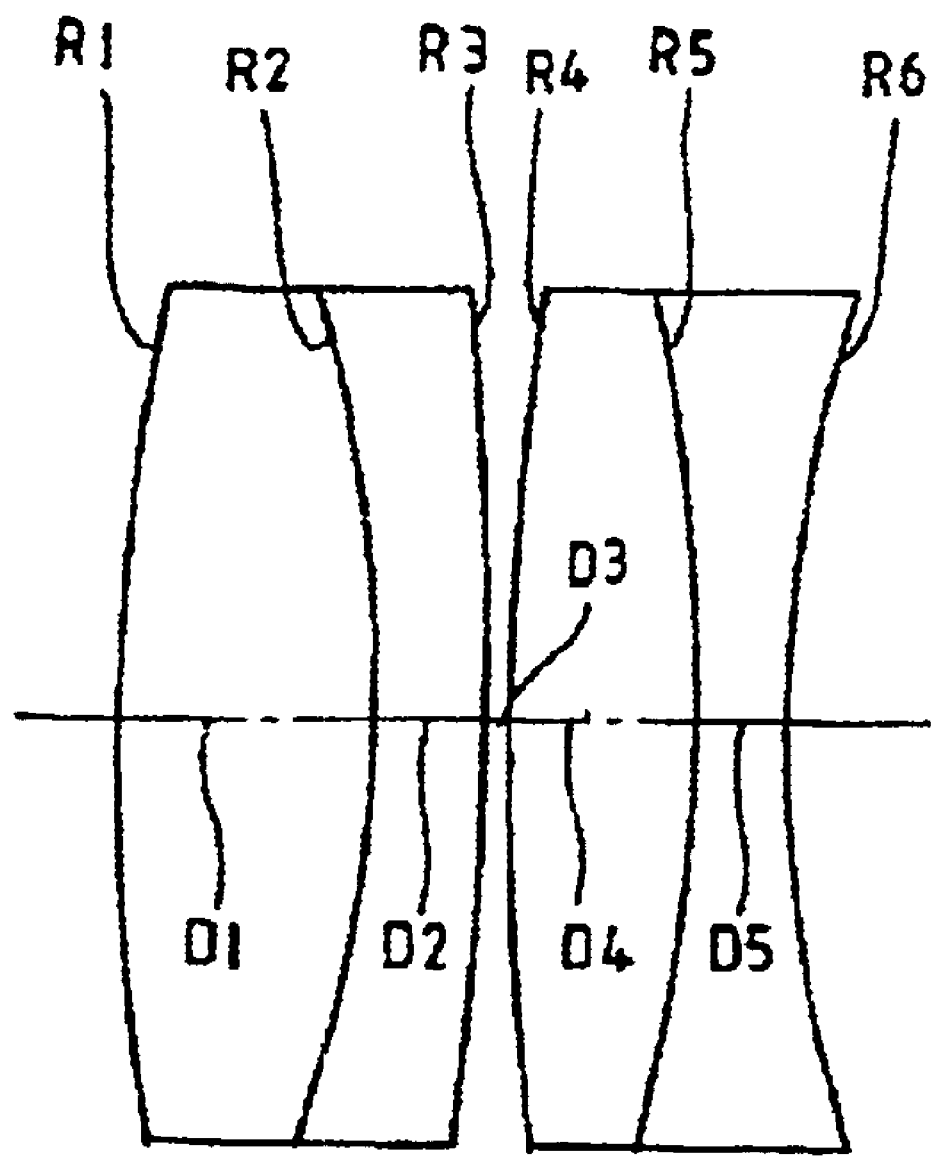
FIG. 9 is a sectional view of an imaging lens system suitable for use with the microscope objective lens system according to this invention.

These numerical examples are infinity correction objective lens systems, that is, the outgoing light from the objective lens system is a parallel light bundle. For forming a real image at a finite distance from the objective lens system, an imaging lens system is used with the objective lens system. FIG. 9 shows an example of the imaging lens system. The numerical data are shown below.

Numerical example of an imaging lens system

| | | | |
|---|---|---|---|
| R1 = 68.7541 | D1 = 7.7321 | N1 = 1.48749 | V1 = 70.20 |
| R2 = −37.5679 | D2 = 3.4742 | N2 = 1.80610 | V2 = 40.95 |
| R3 = −102.8477 | D3 = 0.6973 | | |
| R4 = 84.3099 | D4 = 6.0238 | N3 = 1.83400 | V3 = 37.16 |
| R5 = −50.7100 | D5 = 3.0298 | N4 = 1.64450 | V4 = 40.82 |
| R6 = 40.6619 | | | | wherein R1, R2, . . . are radii of curvatures of respective lens surfaces, D1, D2, . . . are distances between lens surfaces, N1, N2, . . . are refractive indices at the Fraunhofer d-line (587.56 nm) of respective lens elements, and V1, V2, . . . are Abbe's numbers of respective lens elements. The unit of length is the millimeter.

This imaging lens system can be disposed at a position of 50 mm–170 mm from the objective lens system.

FIGS. 5A through 5D are graphs of aberrations of numerical example 1, FIGS. 6A through 6D graphs of aberrations of numerical example 2, FIGS. 7A through 7D graphs of aberrations of numerical example 3, and FIGS. 8A through 8D graphs of aberrations of numerical example 4. These figures indicate aberration curves when a cover glass and oil shown below, and above described imaging lens system are used with each of the numerical examples. The imaging lens is spaced 120 mm apart from the objective lens system.

| | | |
|---|---|---|
| Cover glass d = 0.17 mm, | nd = 1.521, | vd = 56.02 |
| Oil | nd = 1.51548, | vd = 43.1 |

FIG. 5A through FIG. 8A are graphs of spherical aberrations, FIG. 5B through FIG. 8B are graphs of the offences against the sine condition, FIG. 5C through FIG. 8C are graphs of astigmatism, and FIG. 5D through FIG. 8D are graphs of distortions. Aberration, particularly spherical aberration, chromatic aberration and image curvature are well corrected.

Although this invention has been described in detail with respect to the foregoing examples, this invention is not limited to the above examples but, on the contrary, various modifications are possible without departing from the spirit of this invention. All such modifications would be intended to be included within the scope of the following claims.

What is claimed is:

1. An objective lens system for microscope comprising, in order from an object side:

a first lens unit including a plurality of cemented lens components and converging light coming from an object, a second lens unit including a negative lens component having a concave surface of strong optical power on the image side, and a third lens unit including a cemented doublet composed of a negative lens element having a concave surface on the object side and a positive lens element, wherein said objective lens system satisfies the following conditions (1) through (3):

$$1.65 \leq nd \leq 1.8 \tag{1}$$

$$25 \leq vd \leq 41 \tag{2}$$

$$T360 \geq 0.5 \tag{3}$$

wherein nd and vd are refractive index at d-line and abbe's number of the positive lens element in the third lens unit, respectively, T360 is an internal transmittance except for a reflection loss at 360 nm for a 10 mm thickness of the material forming the positive lens element in the third lens unit.

2. The objective lens system according to claim 1, further satisfying the following conditions (4) and (5):

$$vd(L3N)-vd(L3P)>10 \tag{4}$$

$$|nd(L3N)-nd(L3P)|<0.2 \tag{5}$$

wherein vd(L3N) and vd(L3P) are Abbe's numbers of the negative lens element and the positive lens element in the third lens unit, respectively, and nd(L3N) and nd(L3P) are refractive indices at d-line of the negative lens element and the positive lens element in the third lens unit, respectively.

3. The objective lens system according to claim 1, further satisfying the following condition (6):

$$|f2/f| \leq 20 \tag{6}$$

wherein f2 is a focal length of the second lens unit and f is a focal length of the objective lens system as a whole.

4. The objective lens system according to claim 2, further satisfying the following condition (6):

$$|f2/f| \leq 20 \tag{6}$$

wherein f2 is a focal length of the second lens unit, and f is a focal length of the objective lens system as a whole.

5. The objective lens system according to claim 1, wherein the objective lens system satisfies at least one of the following conditions (1-1) and (2-1):

$$1.7 \leq nd \leq 1.75 \tag{1-1}$$

$$30 \leq vd \leq 36 \tag{2-1}$$

6. The objective lens system according to claim 2, wherein the objective lens system satisfies at least one of the following conditions (1-1) and (2-1):

$$1.7 \leq nd \leq 1.75 \tag{1-1}$$

$$30 \leq vd \leq 36 \tag{2-1}$$

7. The objective lens system according to claim 3, wherein the objective lens system satisfies at least one of the following conditions (1-1) and (2-1):

$$1.7 \leq nd \leq 1.75 \tag{1-1}$$

$$30 \leq vd \leq 36 \tag{2-1}$$

8. The objective lens system according to claim 4, wherein the objective lens system satisfies at least one of the following conditions (1-1) and (2-1):

$$1.7 \leq nd \leq 1.75 \tag{1-1}$$

$$30 \leq vd \leq 36 \tag{2-1}$$

9. The objective lens system according to claim 1, further satisfying the following condition (7):

$$|R(L3P)| \geq 2.6 \tag{7}$$

wherein R(L3P) is a radius of curvature of an image side surface of the positive lens element in the third lens unit, and f is a focal length of the objective lens system.

10. The objective lens system according to claim 2, further satisfying the following condition (7):

$$|R(L3P)| \geq 2.6 \tag{7}$$

wherein R(L3P) is a radius of curvature of an image side surface of the positive lens element in the third lens unit, and f is a focal length of the objective lens system.

11. The objective lens system according to claim 3, further satisfying the following condition (7):

$$|R(L3P)| \geq 2.6 \tag{7}$$

wherein R(L3P) is a radius of curvature of an image side surface of the positive lens element in the third lens unit, and f is a focal length of the objective lens system.

12. The objective lens system according to claim 4, further satisfying the following condition (7):

$$|R(L3P)| \geq 2.66 \tag{7}$$

wherein R(L3P) is a radius of curvature of an image side surface of the positive lens element in the third lens unit, and f is a focal length of the objective lens system.

13. The objective lens system according to claim 5, further satisfying the following condition (7):

$$|R(L3P)| \geq 2.6 \tag{7}$$

wherein R(L3P) is a radius of curvature of an image side surface of the positive lens element in the third lens unit, and f is a focal length of the objective lens system.

14. The objective lens system according to claim 6, further satisfying the following condition (7):

$$|R(L3P)| \geq 2.6 \tag{7}$$

wherein R(L3P) is a radius of curvature of an image side surface of the positive lens element in the third lens unit, and f is a focal length of the objective lens system.

15. The objective lens system according to claim 7, further satisfying the following condition (7):

$$|R(L3P)| \geq 2.6 \tag{7}$$

wherein R(L3P) is a radius of curvature of an image side surface of the positive lens element in the third lens unit, and f is a focal length of the objective lens system.

16. The objective lens system according to claim 8, further satisfying the following condition (7):

$$|R(L3P)| \geq 2.6 \tag{7}$$

wherein R(L3P) is a radius of curvature of an image side surface of the positive lens element in the third lens unit, and f is a focal length of the objective lens system.

17. The objective lens system according to claim 1, wherein said first lens unit includes two cemented triplet lens components.

18. The objective lens system according to claim 2, wherein said first lens unit includes two cemented triplet lens components.

19. The objective lens system according to claim 3, wherein said first lens unit includes two cemented triplet lens components.

20. The objective lens system according to claim 4, wherein said first lens unit includes two cemented triplet lens components.

21. The objective lens system according to claim 5, wherein said first lens unit includes two cemented triplet lens components.

22. The objective lens system according to claim 6, wherein said first lens unit includes two cemented triplet lens components.

23. The objective lens system according to claim 7, wherein said first lens unit includes two cemented triplet lens components.

24. The objective lens system according to claim 8, wherein said first lens unit includes two cemented triplet lens components.

* * * * *